US011909139B2

(12) United States Patent
Yang et al.

(10) Patent No.: US 11,909,139 B2
(45) Date of Patent: Feb. 20, 2024

(54) ELECTRICAL CONNECTOR

(71) Applicant: Hirose Electric Co., Ltd., Kanagawa (JP)

(72) Inventors: Chunkai Yang, Kanagawa (JP); Kota Aizawa, Kanagawa (JP)

(73) Assignee: Hirose Electric Co., Ltd., Kanagawa (JP)

( * ) Notice: Subject to any disclaimer, the term of this patent is extended or adjusted under 35 U.S.C. 154(b) by 170 days.

(21) Appl. No.: 17/680,834

(22) Filed: Feb. 25, 2022

(65) Prior Publication Data

US 2022/0302622 A1 Sep. 22, 2022

(30) Foreign Application Priority Data

Mar. 16, 2021 (JP) ................................ 2021-042734

(51) Int. Cl.
*H01R 13/20* (2006.01)
*H01R 13/502* (2006.01)
*H01R 13/629* (2006.01)
*H01R 13/11* (2006.01)

(52) U.S. Cl.
CPC ............ *H01R 13/20* (2013.01); *H01R 13/11* (2013.01); *H01R 13/502* (2013.01); *H01R 13/629* (2013.01)

(58) Field of Classification Search
CPC ....... H01R 12/52; H01R 13/20; H01R 13/629
See application file for complete search history.

(56) References Cited

U.S. PATENT DOCUMENTS

| | | | | |
|---|---|---|---|---|
| 6,695,622 B2 * | 2/2004 | Korsunsky | H01R 31/06 | 439/631 |
| 8,485,831 B2 * | 7/2013 | Cipolla | H01R 13/514 | 439/74 |
| 9,017,103 B2 * | 4/2015 | Davis | H01R 12/716 | 439/607.1 |
| 9,385,458 B2 * | 7/2016 | Jeon | H01R 13/6587 | |
| 10,516,226 B2 * | 12/2019 | Tamai | H01R 13/6315 | |
| 10,608,363 B2 * | 3/2020 | Sano | H01R 13/5025 | |
| 2022/0302622 A1 * | 9/2022 | Yang | H01R 13/11 | |

FOREIGN PATENT DOCUMENTS

JP 2019-102229 A 6/2019

* cited by examiner

*Primary Examiner* — Neil Abrams
(74) *Attorney, Agent, or Firm* — Procopio, Cory, Hargreaves & Savitch LLP

(57) ABSTRACT

Housings have blade receiving portions for blade insertion formed in a peripheral wall by two side walls facing each other in the through-thickness direction of the blades and two end walls; the multiple connecting units include end connecting units located at the opposite ends in the through-thickness direction of the blades and intermediate connecting units located between the end connecting units; engagement grooves engaging with counterpart connect bodies formed in the intermediate connecting units between the side walls and the end walls of the housing to extend in the through-thickness direction of the blades and be open toward the counterpart connect bodies; and no grooves are formed in end connecting units to an extent equal to or greater than the depth of the engagement grooves of the intermediate connecting units between the end walls and the outer side walls located on the outside in the through-thickness direction of the blades.

4 Claims, 8 Drawing Sheets

ELECTRICAL CONNECTOR

CROSS-REFERENCE TO RELATED APPLICATIONS

This application claims priority to Japanese Patent Application No. 2021-042734, filed Mar. 16, 2021, the contents of which are incorporated herein by reference in its entirety for all purposes.

BACKGROUND

Technical Field

The present invention relates to an electrical connector.

Related Art

An electrical connector in which blades retaining an array of multiple terminals are retained by a housing and the blades are connected to counterpart connect bodies has been disclosed in Patent Document 1. The blades, which retain an array of multiple terminals extending in the direction of connection with counterpart connectors serving as counterpart connect bodies, are retained by the housing and form a single connecting unit, and a plurality of connecting units of the same configuration are arranged side-by-side and coupled in the through-thickness direction of the blades, thereby forming the electrical connector disclosed in Patent Document 1. The housing, which has a peripheral wall formed by two side walls facing each other in the through-thickness direction of the blades and two end walls located outside of the blade range in the width direction of the blades, has the blades inserted into and retained by receiving grooves used for blade insertion that are formed in said peripheral wall.

On the other hand, in the same manner as the above-described electrical connector, the counterpart connectors are also formed by coupling multiple units (counterpart units) using linking members. The linking members are made from a metal plate that joins the ends of multiple counterpart units (ends of the blades in the width direction) together.

In the above-described electrical connector to which the counterpart connectors are connected, slit-shaped engagement grooves used for receiving a portion of the linking members of the counterpart connectors are formed in both side walls in the housings of all the connecting units so as to be open toward the counterpart connectors. Such engagement grooves are formed in positions bordering the side walls and end walls.

In Patent Document 1, all the connecting units are made in the same configuration. Therefore, among the multiple connecting units arranged side-by-side, the connecting units located at the opposite ends (end connecting units) in the direction of coupling of the connecting units (the same direction as the through-thickness direction of the blades) also have engagement grooves formed in both side walls, i.e., both the inner side walls located on the inside and the outer side walls located on the outside in the above-mentioned direction of coupling. However, in Patent Document 1, when the electrical connector and the counterpart connectors are in a mated state, the linking members of the counterpart connectors do not reach positions corresponding to the outer side walls of the end connecting units of the electrical connector in the above-mentioned direction of coupling and, consequently, the linking members do not enter the engagement grooves formed in the outer side walls of the end connecting units in the electrical connector. The connecting units to be coupled are not in surface contact with, i.e., not present at, the outer side walls of these end connecting units.

PATENT DOCUMENTS

[Patent Document 1]
Japanese Published Patent Application No. 2019-102229

SUMMARY

Technical Problem

The housings of all the connecting units in the electrical connector are made by molding resin and, due to the fact that multiple connecting units are coupled such that their side walls are placed in surface contact with one another, the side walls are often formed to be relatively thin in order to make the electrical connector more compact. Consequently, the side walls, which may also be longer than the end walls, are susceptible to a decrease in strength.

In Patent Document 1, engagement grooves that receive a portion of the linking members of the counterpart connectors are formed in boundary positions between such side walls and end walls, as a result of which the strength of the side walls in the above-mentioned boundary positions is decreased. Consequently, there is a risk that when the end connecting units are subject to external forces acting on the outer side walls that are located on the outside in the direction of coupling in a free state, the units may end up deformed or damaged due to the absence of connecting units supporting the outer side walls.

For example, when the electrical connector and the counterpart connectors are in a mated state, a portion of the counterpart connector units is nested in the receiving portions of the connecting units of the electrical connector, as a result of which the two side walls of the connecting units are pushed apart by the counterpart units and are subject to external forces directed away from each other. Since the same external forces, as reaction forces from adjacent connecting units, then act on side walls placed in surface contact with each other in pairs of adjacent connecting units in mutually opposite directions in the above-mentioned direction of coupling, these external forces are offset against the reaction forces and, as a result, the side walls are not subject to flexural deformation. However, in the end connecting units located at the opposite ends in the above-mentioned direction of coupling among the multiple connecting units, one of the two side walls of the end connecting units, i.e., the outer side wall located on the outside in the above-mentioned direction of coupling, is not in surface contact with other connecting units and is not supported in any way, which is why there is a risk that it may be subject to forces from counterpart units, undergo outward flexural deformation, and be damaged.

In view of the aforesaid circumstances, it is an object the present invention to provide an electrical connector in which no decrease in strength occurs in the outer side walls on the outside of the connecting units located at the ends in the direction of coupling.

Technical Solution

It is an object to provide an electrical connector in which there is no loss of strength in the outer side walls of the connecting units located at the ends in the direction of coupling.

In the inventive electrical connector, multiple connecting units, which are formed as a result of retaining, in a housing, plate-shaped blades retaining an array of multiple terminals extending in the direction of connection with counterpart connect bodies, are coupled such that the direction of coupling is the through-thickness direction of the blades.

In such an electrical connector, in the present invention, the housing has a peripheral wall formed by two side walls facing each other in the through-thickness direction of the blades and two end walls located outside of the blade range in the plate width direction of the blades, i.e., in the connector width direction, blade receiving portions used for blade insertion are formed in the peripheral wall, the blades are inserted into and retained by the blade receiving portions of the housing, the multiple connecting units have end connecting units located at the opposite ends in the through-thickness direction of the blades and intermediate connecting units located between the end connecting units at the opposite ends, engagement grooves that engage with a portion of the counterpart connect bodies are formed in the intermediate connecting units between the side walls and end walls of the housing so as to extend in the through-thickness direction of the blades and be open toward the counterpart connect bodies, and grooves open toward the above-mentioned counterpart connect bodies to an extent equal to or greater than the depth of the engagement grooves of the above-mentioned intermediate connecting units are not formed in the end connecting units between the end walls and at least the outer side walls located on the outside in the through-thickness direction of the blades.

In accordance with the thus-conceived invention, engagement grooves for engagement with a portion of the counterpart connectors are formed between the end walls and side walls of the intermediate connecting units in the direction of coupling, i.e., in the through-thickness direction of the blades, but grooves open toward the counterpart connect bodies to an extent equal to or greater than the depth of the engagement grooves of the intermediate connecting units are not formed in at least the outer side walls of the end connecting units. Therefore, there is no decrease in the strength of the outer side walls of the end connecting units, a higher level of strength is ensured in comparison with the inner side walls of the end connecting units and the side walls of the intermediate connecting units. Therefore, when the two side walls of the end connecting units are pushed apart by the counterpart units and are subject to external forces directed away from each other when the electrical connector and the counterpart connectors are in a mated state, the outer side walls of the end connecting units are unlikely to undergo flexural deformation and, consequently, unlikely to be damaged owing to their own strength even though they are not in surface contact with the connecting units and not supported in any way whatsoever.

In the present invention, it is preferable that at least the outer side walls of the end connecting units should have a thickness greater than the side walls of the intermediate connecting units.

Thus, making the outer side walls of the end connecting units thicker than the side walls of the intermediate connecting units, can further enhance the strength of the outer side walls of the end connecting units and adequately prevent the flexural deformation of and, consequently, damage to, the outer side walls.

In the present invention, it is preferable that the outer side walls in the end connecting units should be thicker than the inner side walls located on the inside in the through-thickness direction of the blades and, in addition, that through-holes or recesses should be formed on the side of the above-mentioned outer side walls in the above-mentioned direction of coupling.

Due to the fact that the side walls are longer than the end walls in any connecting units, including both the intermediate connecting units and the end connecting units, molten resin material is usually injected into a mold from the side of an end wall, and, as a result, the molten resin material is diverted from the position of one end wall to both side wall sections and then arrives at the position of the other end wall. If the wall thickness of the two side walls in the end connecting units is different at such time, the molten resin material flowing through the respective side walls will not reach the position of the other end wall at the same time. Accordingly, the molten resin material diverted to both side walls reaches the position of the other end wall at the same time due to the fact that resistance to the flow of the molten plastic, i.e., the flowability, in both side wall sections is equalized by providing through-holes or recesses on the side of the thicker outer side walls.

In the present invention, it is preferable that the end connecting units should have notched portions formed on the outer surface of the end walls, and the notched portions should be open in said direction of connection and in the through-thickness direction of the blades at, at least, one end in the above-mentioned direction of connection.

When the multiple connecting units are arranged side-by-side and coupled, in order to perform coupling without losing precise alignment, the multiple connecting units or connecting unit components (referred to collectively herein as “connecting units” for ease of discussion) are sometimes supported by performing installation in a state wherein the units are arranged side-by-side in a jig. At such time, it is necessary to make sure that the end connecting units are placed in proper positions, i.e., in the opposite end positions of the multiple intermediate connecting units in the direction of coupling. In the present invention, even if an attempt is made to place the intermediate connecting units in wrong positions, i.e., in the end positions in the direction of coupling in the jig, the intermediate connecting units collide and interfere with protrusions provided at the interior corners of the jig and cannot be placed in the jig. Consequently, placement in a wrong position can be immediately recognized. On the other hand, if an attempt is made to place the end connecting units in proper positions, i.e., in the end positions in the jig, collision with the protrusions in the corners of the jig is avoided with the help of the notched portions formed in the end connecting units, and the end connecting units can be installed without difficulty. In addition, if the notched portions have an asymmetrical shape in the above-mentioned direction of coupling, the same also applies when an attempt is made to place the end connecting units in the above-mentioned proper positions in the jig in an opposite orientation in the direction of coupling.

Technical Effect

In the present invention, as described above, in an electrical connector in which multiple connecting units are coupled in the through-thickness direction of the blades, the multiple connecting units have end connecting units located at the opposite ends in the through-thickness direction of the blades and intermediate connecting units located between the end connecting units at the opposite ends, engagement grooves that engage with a portion of the counterpart connect bodies are formed in the intermediate connecting units between the side walls and end walls of the housing so as to extend in the through-thickness direction of the blades and be open toward the counterpart connect bodies and, by contrast, grooves open toward the counterpart connect bodies to an extent equal to or greater than the depth of the engagement grooves of the intermediate connecting units are not formed in the end connecting units between the end walls and at least the outer side walls located on the outside in the through-thickness direction of the blades, which is why high strength is ensured in comparison with the intermediate connecting units, in which the engagement grooves are formed and strength is decreased due to the presence of the engagement grooves. Consequently, when the two side walls of the end connecting units are pushed apart by the counterpart units and are subject to external forces directed away from each other when the electrical connector and the counterpart connectors are in a mated state, the outer side walls of the end connecting units are unlikely to undergo flexural deformation and, therefore, unlikely to be damaged owing to their own strength even though they are not in surface contact with the connecting units and not supported in any way whatsoever. In addition, since the outer side walls are not involved in engagement with a portion of the counterpart connect bodies, no difficulties arise either in connection with the absence of the engagement grooves.

DETAILED DESCRIPTION

An embodiment of the present invention is described below with reference to the accompanying drawings.

Figure 1:
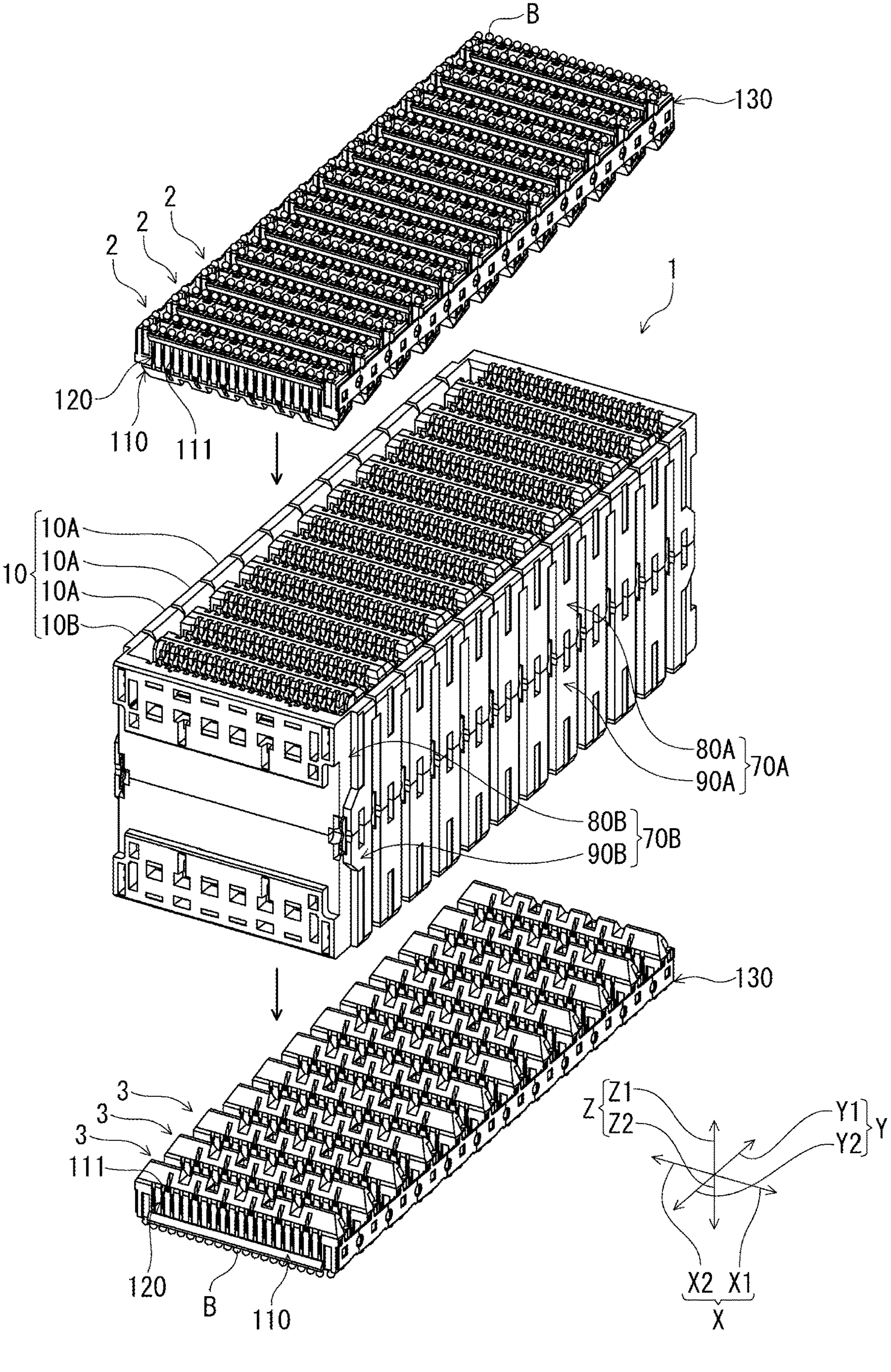
FIG. 1 is a perspective view of an electrical connector according to an embodiment of the present invention and two counterpart connectors connected thereto from above and from below, illustrates a state prior to mating.
Figure 2:
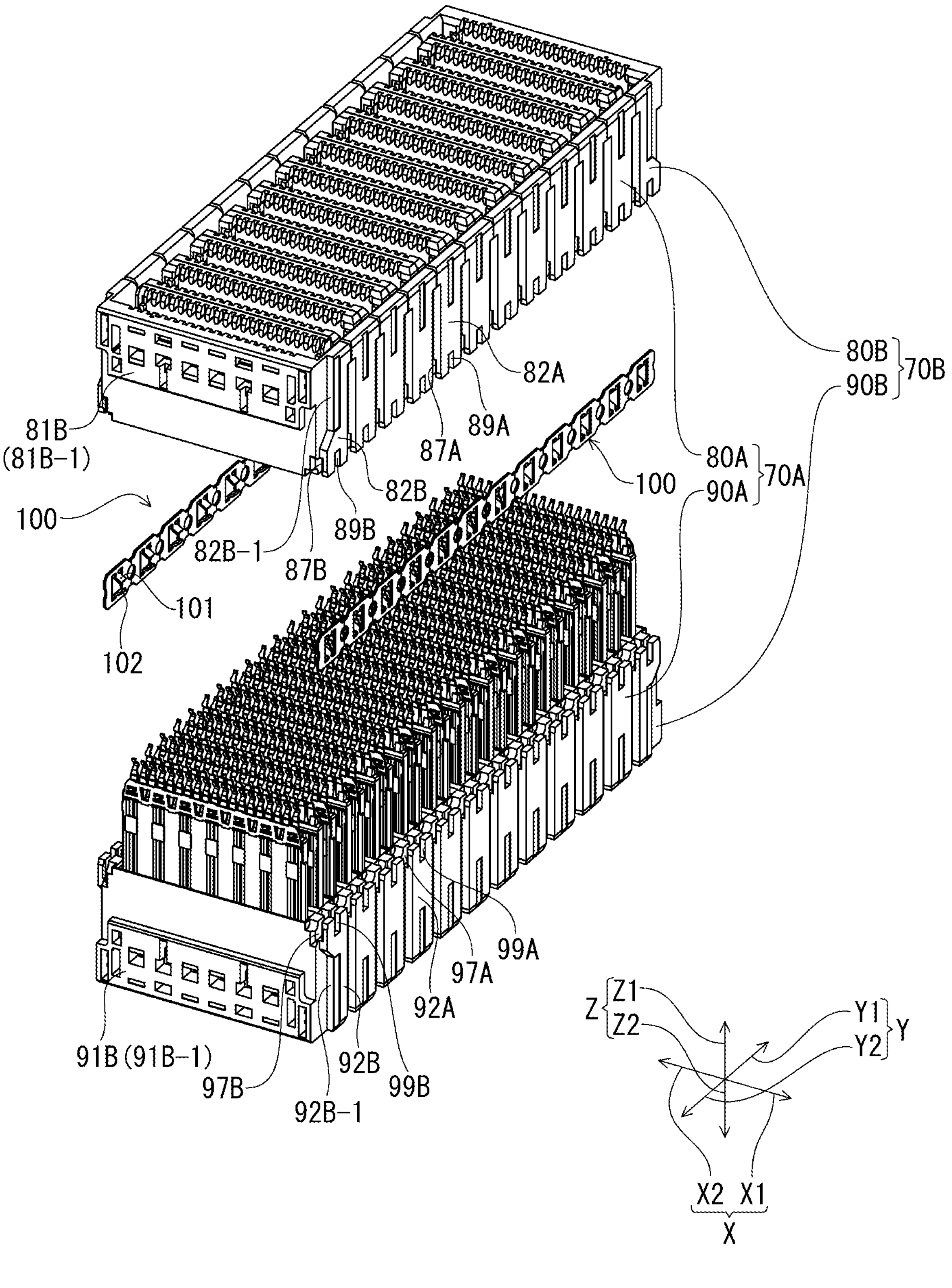
FIG. 2 is an exploded perspective view of the components of the electrical connector of FIG. 1.

FIG. 1, which is a perspective view illustrating an intermediate connecting unit, which is an electrical connector according to an embodiment of the present invention, along with counterpart connectors serving as counterpart connect bodies, illustrates a state before the connectors are connected. Further, FIG. 2 is an exploded perspective view of the components of the intermediate electrical connector of FIG. 1. The intermediate electrical connector 1 according to the present embodiment (referred to simply as "intermediate connector 1" hereinbelow) is connected to a counterpart connector 2 and another counterpart connector 3, which are attached to respective circuit boards that are parallel to each other (not shown), so as to mediate between the counterpart connector 2 and the counterpart connector 3.

In the present embodiment, in order to facilitate an understanding of directions, the connector width direction, which is parallel to the surface of the circuit board, is designated as X (with one way designated as X1, and the other way as X2); the direction of coupling of the connecting units, to be described hereinbelow, which is a direction parallel to the surface of the circuit board and perpendicular to the connector width direction X, is designated as Y (with one way designated as Y1, and the other way as Y2); and the direction of connection of the connectors, which is a vertical direction perpendicular to both the connector width direction X and the direction of coupling Y, is designated as Z (with "up" as Z1, and "down" as Z2).

As can be seen in FIG. 1, the counterpart connector 2 is matingly connected to the intermediate connector 1 from above along the Z1 axis, i.e., downwardly toward Z2 such that the direction of connector insertion and removal is the direction of connection Z. In addition, the intermediate connector 1 is matingly connected to the other counterpart connector 3 from above along the Z1 axis.

The intermediate connector 1 illustrated in FIG. 1 has multiple connecting units 10 connected in alignment with the multiple connecting units of the counterpart connectors 2, 3 (counterpart units) and two coupling members 100 made of sheet metal (see FIG. 2) that collectively couple the multiple connecting units 10 arranged in the direction of coupling Y. In the present embodiment, as can be seen in FIG. 1, there are 12 connecting units 10 provided in alignment with each of the multiple counterpart connectors 2, 3.

The connecting units 10 include two end connecting units 10B located at both ends in the direction of coupling Y and ten intermediate connecting units 10A located between the two end connecting units 10B. Although the end connecting units 10B and intermediate connecting units 10A are different in appearance and outer dimensions, the groove-shaped blade receiving portions 10A-1 used to accommodate the hereinafter-described blades 20 are formed to be of the same shape, which makes it possible for one blade 20 to be selectively inserted both into the end connecting units 10B and into the intermediate connecting units 10A.

In the present embodiment, there are two end connecting units 10B located at both ends in the direction of coupling Y, and there are multiple, i.e., ten, intermediate connecting units 10A located in the middle. For this reason, the explanations will first focus on the intermediate connecting units 10A. At such time, since in the present invention the end connecting units 10B are characterized by being different from the intermediate connecting units 10A in appearance, shape and outer dimensions, the explanations of the internal structure, such as the blade receiving portions, will be made as simple as possible.

Each intermediate connecting unit 10A has a pair of two blades 20 that have the same shape. These two blades 20, which are disposed symmetrically in a face-to-face relationship in the direction of coupling Y of the intermediate connecting units 10A, are inserted and retained in the hereinafter-described groove-shaped blade receiving portions 10A-1 formed in the hereinafter-described housing 70A (see FIG. 6 (A)). Upwardly open spaces between the blades 20 in the top portions of the intermediate connecting units 10A are formed as upper receiving portions 11A (see FIG. 6 (A)) for receiving the counterpart connector 2 from above. On the other hand, downwardly open spaces between the blades 20 in the bottom portions of the intermediate connecting units 10A serve as lower receiving portions 12A (see FIG. 6 (A)) for receiving the counterpart connector 3 from below.

Figure 5B:
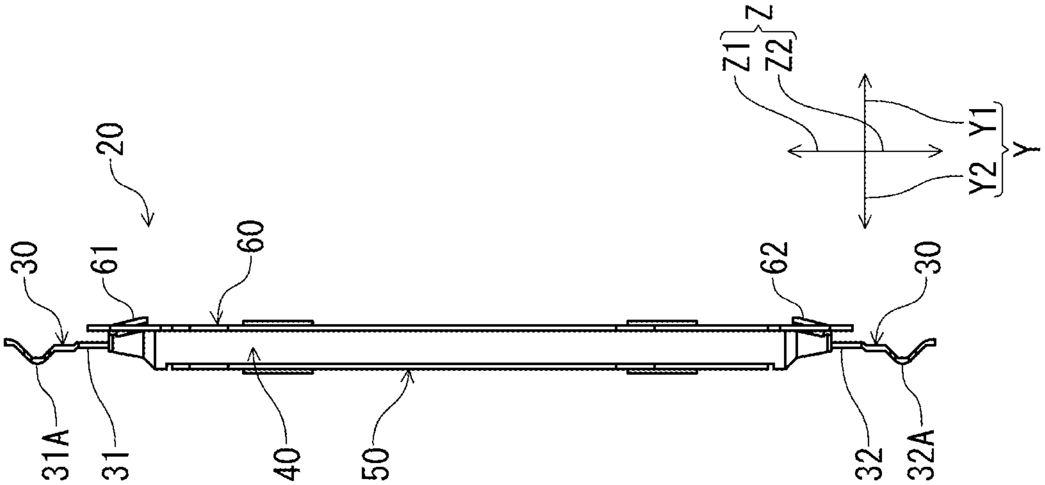
FIGS. 5 (A) and 5 (B) show a blade of the electrical connector of FIG. 1 in isolation, wherein FIG. 5 (A) is a perspective view, and FIG. 5 (B) is a lateral view looking in the connector width direction.
Figure 5A:
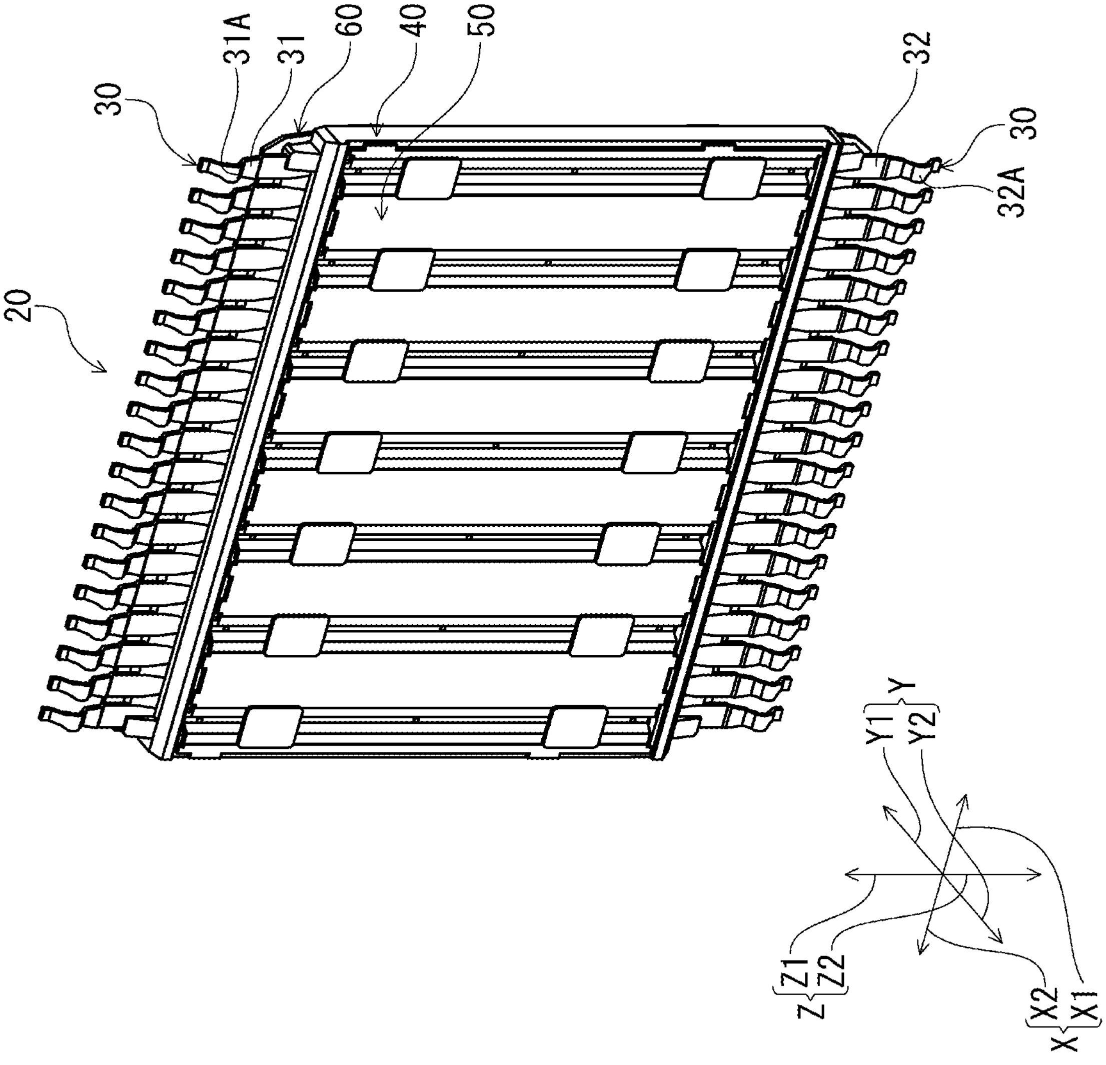

FIG. 5 (A) is a perspective view of a blade 20 of the intermediate connector 1 of FIG. 1 shown in isolation, and FIG. 5 (B) is a lateral view of a blade 20 as viewed in the connector width direction X. As can be seen in FIG. 5 (A), the blade 20 has multiple terminals 30, which are arranged side-by-side in the connector width direction X at equal intervals, a plastic substrate 40, which collectively secures the multiple terminals 30 in place using unitary co-molding, an internal grounding plate 50 attached to one major side of said substrate 40 (Y2 side in FIGS. 5 (A) and 5 (B)), which corresponds to the hereinafter-described "internal side"), and an external grounding plate 60 attached to the other major side (Y1 side in FIGS. 5 (A) and 5 (B)), which corresponds to the hereinafter-described "external side") (see also FIG. 5 (B)). Below, in each blade 20 of the two paired blades 20, the mutually opposed faces are referred to as the "internal side", while the opposite faces are referred to as the "external side".

As can be seen in FIGS. 5 (A) and 5 (B), the terminals 30 are made by partially bending strip-shaped metal members extending in the direction of connection Z, i.e., in the vertical direction in the figure. The terminals 30 have top resilient arm portions 31 that project upwardly from the top end of the substrate 40, bottom resilient arm portions 32 that project downwardly from the bottom end of the substrate 40, and coupling portions 33 that extend in the vertical direction and couple the top resilient arm portions 31 and the bottom resilient arm portions 32 (see FIG. 6 (A)).

Both the top resilient arm portions 31 and bottom resilient arm portions 32 are enabled for resilient displacement in the through-thickness direction (direction of coupling Y). As can be seen in FIGS. 5 (A) and 5 (B), top contact portions 31A and bottom contact portions 32A, which are bent such that they protrude in the direction of coupling Y, i.e., in the through-thickness direction toward the internal side (Y2 side), are formed on the upper end side of said top resilient arm portions 31 and on the lower end side of said bottom resilient arm portions 32. The top contact portions 31A and bottom contact portions 32A are designed to be in resilient contact with the terminals 120 of the counterpart connectors 2, 3 (the hereinafter-described "counterpart terminals 120").

Figure 6A:
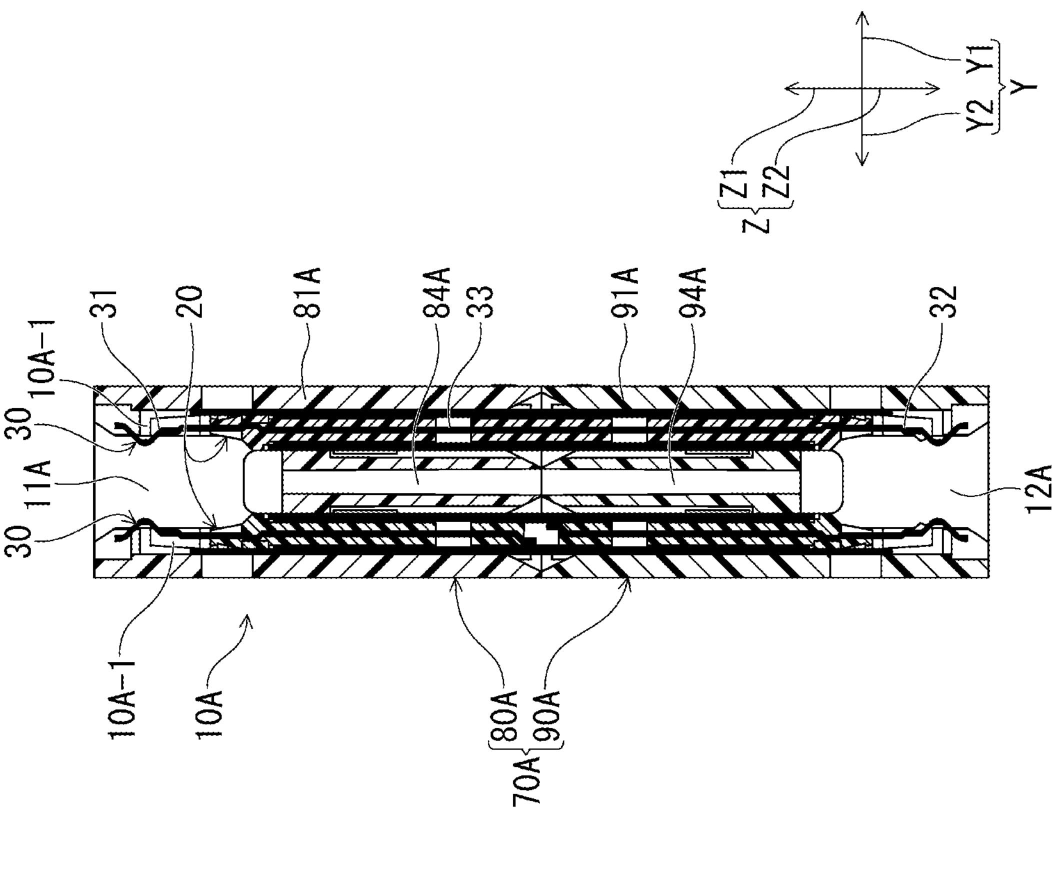
FIGS. 6 (A) and 6 (B) show a cross-sectional view of the connecting units of the electrical connector of FIG. 1, wherein FIG. 6 (A) illustrates an intermediate connecting unit, and FIG. 6 (B) illustrates an end connecting unit.
Figure 6B:
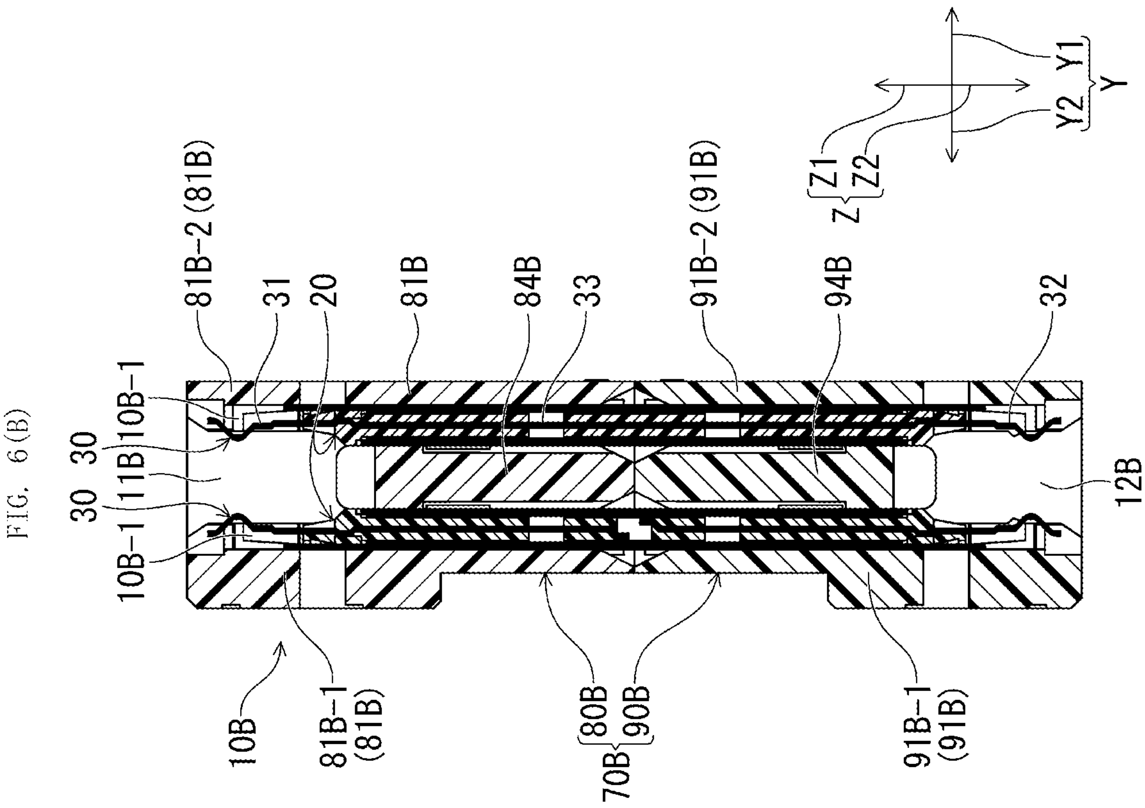

As can be seen in FIGS. 5 (A) and 5 (B), the substrate 40 has a rectangular plate-like configuration that extends across a range that includes the terminal array range in the connector width direction X as well as across the range of the coupling portions 33 (see FIG. 6 (A)) in the direction of connection (vertical direction) Z.

As discussed before, the internal grounding plate 50 is provided so as to be located on the interior side face of the substrate 40 (major face on the Y2 side in FIGS. 5 (A) and 5 (B)). As discussed before, the external grounding plate 60 is provided so as to be located on the exterior side face of the substrate 40 (major face on the Y1 side in FIGS. 5 (A) and 5 (B)). The internal grounding plate 50 and external grounding plate 60 are secured to the substrate 40 by ultrasonic welding in a state of surface contact with the respectively corresponding major faces of the substrate 40. As can be seen in FIG. 5 (B), upper locking pieces 61 are formed on the external grounding plate 60 at the top end, and lower locking pieces 62 are formed at the bottom end by cutting out and raising toward the Y1 side. The upper locking pieces 61 are adapted to lock to the hereinafter-described top housing half 80A and the lower locking pieces 62 are adapted to lock to the bottom housing half 90A (see FIG. 3 (A)).

Figure 3A:
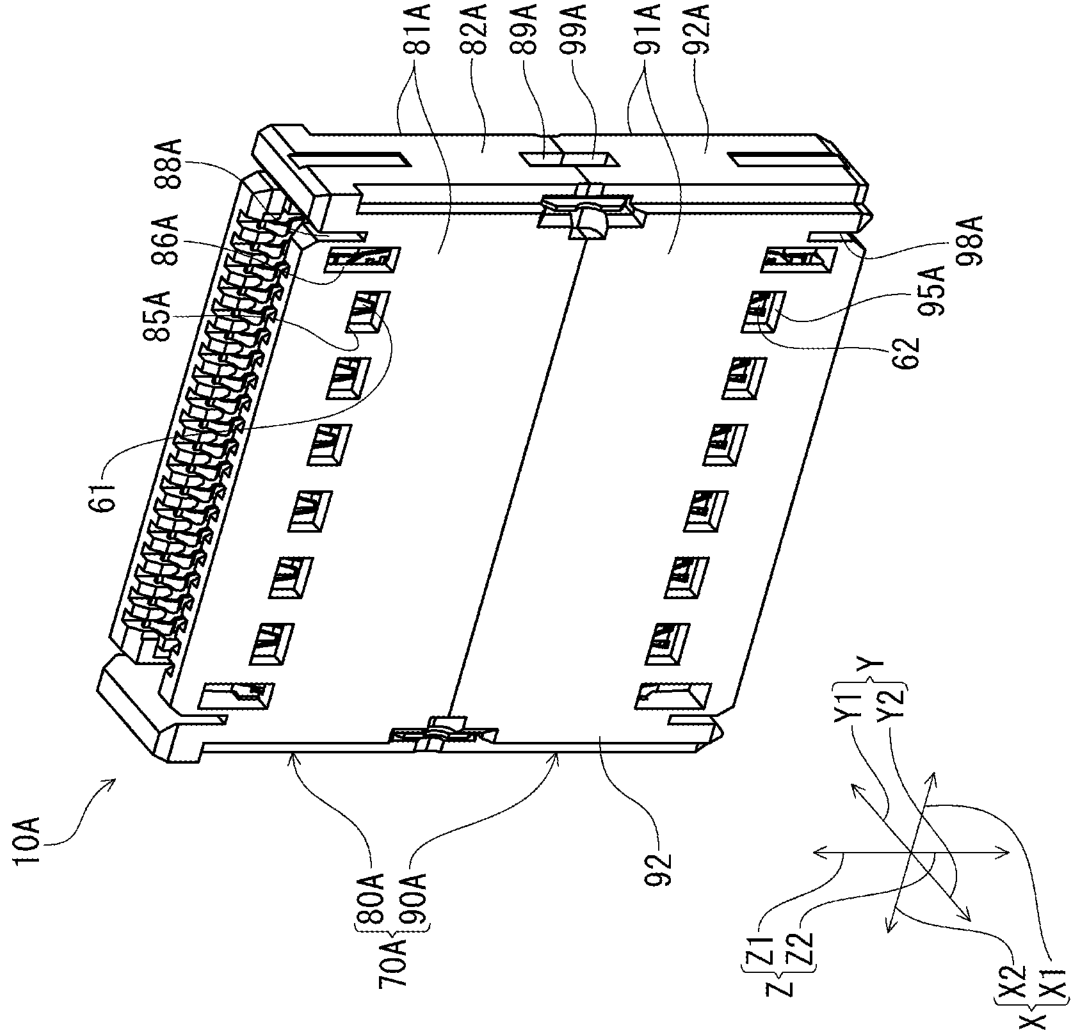
FIGS. 3 (A) and 3 (B) show an intermediate connecting unit of the electrical connector of FIG. 1, wherein FIG. 3 (A) is a perspective view, and FIG. 3 (B) is a lateral view.
Figure 3B:
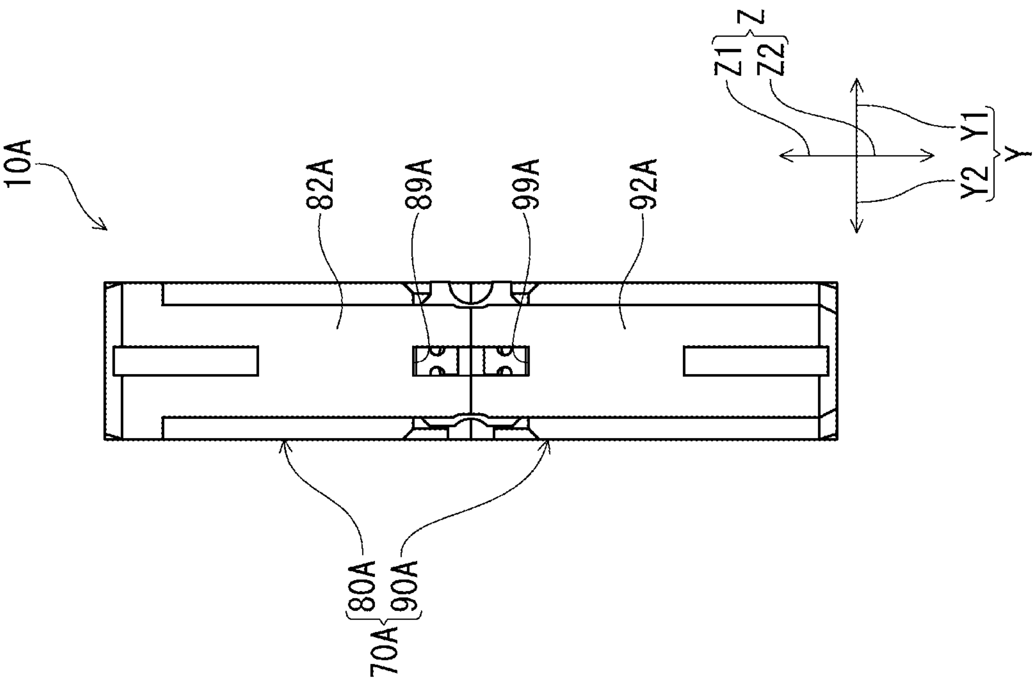

The housing 70A of the intermediate connecting units 10A is made of resin or another electrically insulating material and, as can be seen in FIG. 1 and FIG. 3, has a top housing half 80A and a bottom housing half 90A, which are split in the direction of connection Z. The top housing half 80A and bottom housing half 90A are of the same shape as each other and are positioned such that one is vertically inverted with respect to the other. In the housing 70A, the interior side faces of the two blades 20 are in a face-to-face relationship, with the top housing half 80A accommodating and retaining the top halves of both blades 20 and the bottom housing half 90A accommodating and retaining the bottom halves of both blades 20 (see FIG. 6 (A)).

Below, the configuration of the bottom housing half 90A will be explained with reference to FIGS. 1 to 3 and FIG. 6 (A), while the top housing half 80A will be assigned reference numerals in the "80s" obtained by subtracting "10" from the reference numerals in the "90s" that refer to the respective components of the bottom housing half 90A, and will not be further described herein. As can be seen in FIG. 3 (A), the bottom housing half 90A, which has peripheral wall formed by two side walls 91A extending in the connector width direction X and two end walls 92A extending in the direction of coupling Y of the intermediate connecting units 10A and coupling the ends of the side walls 91A, has a generally square tubular shape of a substantially rectangular parallelepiped-like exterior configuration. A space for receiving the counterpart connector 3, etc., is formed within the interior of said peripheral wall (see FIG. 6 (A)). In addition, as can be seen in FIG. 6 (A), one partition wall 94A is formed in this interior space at the center location of the bottom housing half 90A in the direction of coupling Y. The partition wall 94A extends in the connector width direction X between the two side walls 91A and couples the interior wall faces of the two end walls 92A. Two spaces, which are enclosed by the side walls 91A, end walls 92A, and partition wall 94A, extend in the vertical direction, and which are located proximate the side walls 91A in the direction of coupling Y, accommodate respective blades 20. As can be seen in FIG. 3 (A), locking windows 95A, into which the locking pieces 62 provided on the external grounding plate 60 of the blades 20 lock, are formed at multiple locations through the bottom housing half 90A.

As can be seen in FIG. 2, in the top portion of the end walls 92A, within the wall thickness of the end walls 92A, there are formed upwardly open groove-shaped coupling member accommodating portions 97A that have a slit-shaped configuration extending at right angles to the connector width direction X. The coupling member accommodating portions 97A, which are upwardly open and extend in the direction of coupling Y, accommodate the bottom portions of the hereinafter-described coupling members 100 and are designed to lock with the hereinafter-described claw-shaped locking tabs 102 of the coupling members 100. In addition, end grooves 99A, which are upwardly open and extend in the connector width direction X, are formed in the top portions of the end walls 92A at locations outward of the coupling member accommodating portions 97A in the connector width direction X (see also FIG. 3 (A)).

In addition, as can be seen in FIG. 3 (A), engagement grooves 98A of a slit-shaped configuration, which extend in the direction of coupling Y and are downwardly open, are formed in the bottom portion of the bottom housing half 90A at locations between the side walls 91A and the end walls 92B in the connector width direction X. The engagement grooves 98A are located inwardly of the coupling member accommodating portions 97A (see FIG. 2) in the connector width direction X. The engagement grooves 98A receive the top portion of the hereinafter-described linking member 130 of the counterpart connector 3 from below when the connectors are in a mated state and are adapted to engage said top portion. As used herein, the term "engage" refers to accommodating the top portion of the linking member 130 within the engagement grooves 98A.

In the same manner as in the case of the intermediate connecting units 10A, the housing 70B of the end connecting units 10B is made of resin or another electrically insulating material and, as can be seen in FIG. 1, has a top housing half 80B and a bottom housing half 90B, which are split in the direction of connection Z. The top housing half 80B and bottom housing half 90B are identical in shape to each other. In the housing 70B, the interior side faces of the two blades 20 are in a face-to-face relationship, with the top housing half 80B accommodating and retaining the top halves of both blades 20 and the bottom housing half 90B accommodating and retaining the bottom halves of both blades 20 (see FIG. 6 (B)).

The housing 70B of the end connecting units 10B differs from the housing 70A of the intermediate connecting units 10A in appearance, i.e., its outer shape and outer dimensions. Below, in the discussion of the housing 70B, in the same manner as in the case of the housing 70A, the configuration of the bottom housing half 90B will be explained with reference to FIGS. 1 to 2, FIG. 4 and FIG. 6 (B), while the top housing half 80B will be assigned reference numerals in the "80s" obtained by subtracting "10" from the reference numerals in the "90s" that refer to the respective components of the bottom housing half 90B, and will not be further described herein.

Figure 4B:
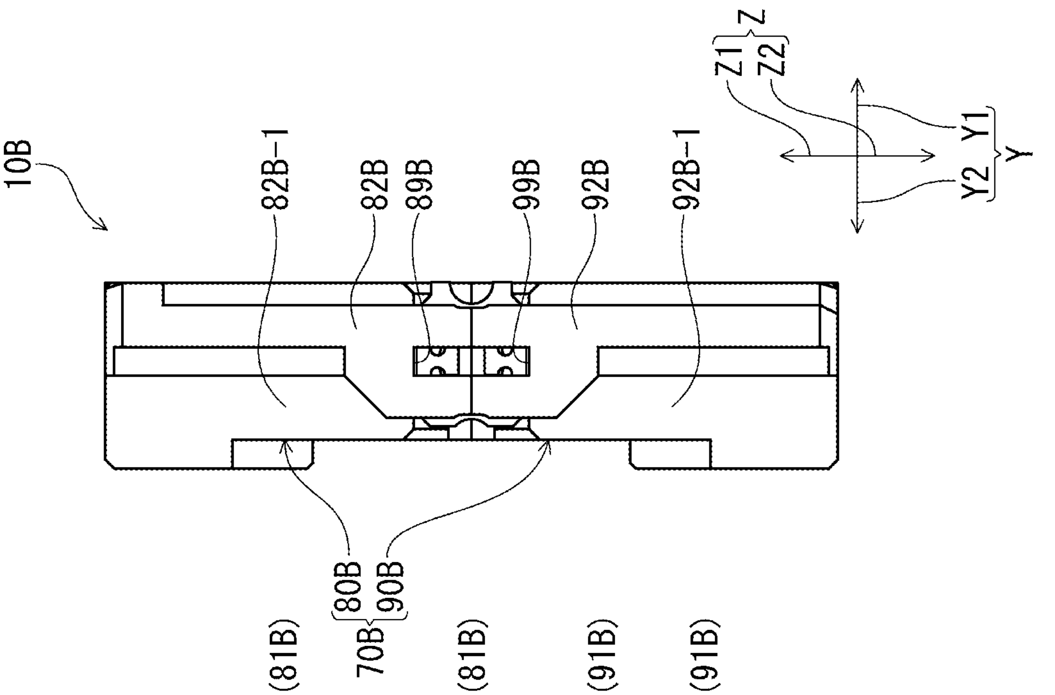
FIGS. 4 (A) and 4 (B) show an end connecting unit of the electrical connector of FIG. 1, wherein FIG. 4 (A) is a perspective view, and FIG. 4 (B) is a lateral view.
Figure 4A:
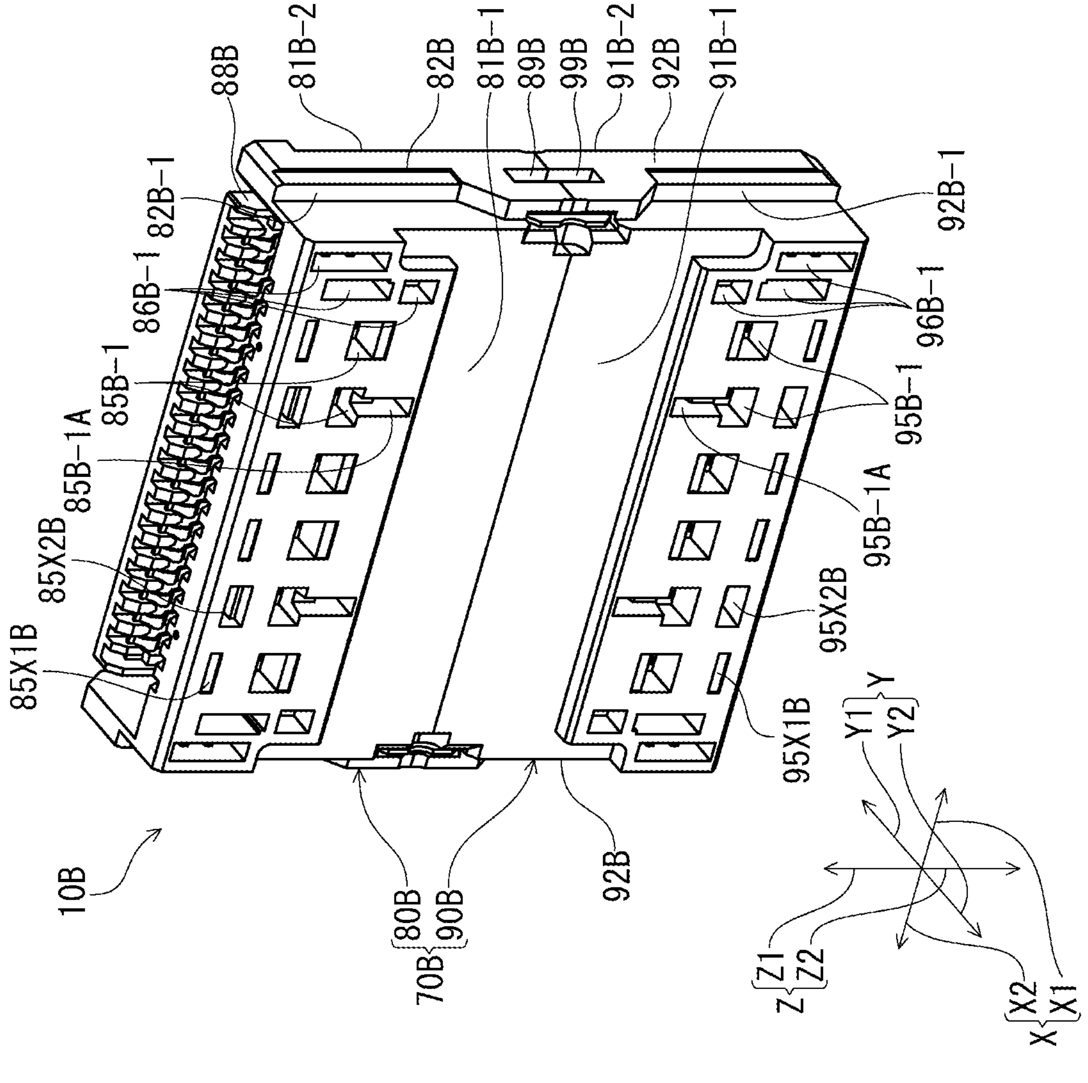

As can be seen in FIG. 4 (A), the bottom housing half 90B which, when viewed in the direction of connection Z, i.e., in the vertical direction, has a peripheral wall formed by two side walls 91B ("outer side wall 91B-1" and "inner side wall 91B-2" described hereinbelow) extending in the connector width direction X and two end walls 92B extending in the direction Y of the intermediate connecting units 10A and coupling the ends of the side walls 91B, has a generally square tubular shape of a substantially rectangular parallelepiped-like exterior configuration. A space for receiving the counterpart connector 3, etc., is formed within the interior of said peripheral wall (see also FIG. 6 (B)). In addition, since the structure of the interior space of the end connecting units 10B is exactly the same as in the intermediate connecting units 10A, as can be seen in FIG. 6 (B), the letter "A" of the reference numerals used in the case of the intermediate connecting units 10A is changed to "B", and its structure is not further described herein.

The two side walls 91B have an outer side wall 91B-1 located on the external side (side Y2 in FIGS. 4 (A) and 4 (B) and FIG. 6 (B)) in the direction of coupling Y, and an inner side wall 91B-2 located on the internal side (side Y1 in FIGS. 4 (A) and 4 (B) and FIG. 6 (B)) in the direction of coupling Y. As can be seen in FIG. 1, the outer side wall 91B-1 is located at the outermost end in the direction of coupling Y without being in a face-to-face relationship with the intermediate connecting units 10A. On the other hand, the inner side wall 91B-2 is located in a face-to-face relationship with a side wall 91A of an intermediate connecting unit 10A adjacent in the direction of coupling Y. In the present embodiment, the wall thickness of the outer side wall 91B-1 is greater than that of the inner side wall 91B-2. In addition, the inner side wall 91B-2 has the same wall thickness as the side walls 91A of the intermediate connecting units 10A. In other words, the outer side wall 91B-1 has a greater wall thickness than the side walls 91A of the intermediate connecting units 10A.

The outer side wall 91B-1 does not need to have a greater wall thickness than the inner side wall 91B-2 along its entire extent in the direction of connection Z and may have a greater wall thickness in some areas in the same direction. In the present embodiment, as can be seen in FIGS. 4 (A) and 4 (B), its wall thickness is larger in the bottom portion, i.e., in the area in the direction of connection with the counterpart connector 3.

As can be seen in FIG. 4 (A), in the same manner as in the case of the side walls 91A of the bottom housing half 90A of the intermediate connecting units 10A, locking windows 95B-1, into which the lower locking pieces 62 provided in the external grounding plate 60 of the blade 20 are locked, are formed at multiple locations through the outer side wall 91B-1. Enlarged portions 95B-1A, which expand the space of the windows, are provided in some of the multiple locking windows 95B-1 in the outer side wall 91B-1. Furthermore, in the outer side wall 91B-1, at locations spaced apart in the direction of connection Z, through-holes 95X1B, 95X2B are formed in the same positions as the locking windows 95B-1 in the connector width direction X. In addition, as can be seen in FIG. 4 (A), the bottom housing half 90B has formed therein, extending in the direction of coupling Y, through-holes 96B-1 with opening portions extending in the vertical direction at locations outward of the locking windows 95B-1 in the connector width direction X, i.e., at the locations of the end walls 92B as well as at locations between the outer side wall 91B-1 and the end walls 92B. These locking windows 95B-1 and through holes 95X1B, 95X2B, and 96B-1 are formed not on the side of the inner side wall 91B-2 in the bottom housing half 90B, but only on the side of the outer side wall 91B-1.

When the bottom housing half 90B is molded by injecting molten resin material from the location of one of the end walls into a mold, the enlarged portions 95B-1A of the locking windows 95B-1 and the through-holes 95X1B, 95X2B, and 96B-1 serve to equalize, as much as possible, the flowability of the molten resin material between the side of the outer side wall 91B-1 and the side of the inner side wall 91B-2, whose wall thicknesses are different from each other. In other words, providing the enlarged portions 95B-1A and the through-holes 95X1B, 95X2B, and 96B-1 only in the outer side wall 91B-1, which has a greater wall thickness, increases flow resistance on the side of the outer side wall 91B-1 and, as a result, makes the flowability on the side of the outer side wall 91B-1 substantially the same as the flowability on the side of the inner side wall 91B-2. Therefore, the molten resin material diverted toward the outer side wall 91B-1 and toward the inner side wall 91B-2 reach the location of the other end wall at substantially the same time.

The shape, position, and number of the through-holes intended to equalize the flowability of the molten resin material as much as possible can be set appropriately depending on the shape of the bottom housing half 90B, and the enlarged portions 95B-1A of the locking windows 95B-1 and the through holes 95X1B, 95X2B, and 96B-1 illustrated in FIG. 4 (A) are merely an example. In addition, using through-holes extending therethrough in the direction of coupling Y is not essential, and a blind recess may be formed instead.

As can be seen in FIG. 4 (A), the end walls 92B in the bottom housing half 90B of the end connecting units 10B have a notched portion 92B-1 formed on the outer surface thereof so as to be located on the side of the outer side wall 91B-1 (Y2 side in FIGS. 4 (A) and 4 (B)) in the direction of coupling Y, be open outwards, and be open in the direction of connection Z along the downward Z2-axis. As described hereinafter, these notched portions 92B-1 are formed for cooperating with an assembly jig in such a manner that the connecting units 10A, 10B are placed in the assembly jig in proper position and in proper orientation when coupling the intermediate connecting units 10A and the end connecting units 10B, which have different outer shapes and outer dimensions.

In addition, engagement grooves (not shown) of the same shape as the engagement grooves 98A of the intermediate connecting units 10A (see FIG. 3 (A)), i.e., of a slit-shaped configuration that extends in the direction of coupling Y and is downwardly open, are formed in the bottom portion of the bottom housing half 90B at locations between the inner side wall 91B-2 and the end walls 92B in the connector width direction X. Said engagement grooves are shaped as vertically inverted engagement grooves 88B formed in the top portion of the top housing half 80B, as illustrated in FIG. 4 (A). The engagement grooves are located inwardly of the coupling member accommodating portions 97B (see FIG. 2) in the connector width direction X. Said engagement grooves receive the top portion of the hereinafter-described linking member 130 of the counterpart connector 3 from below when the connectors are in a mated state and are adapted to engage said top portion.

On the other hand, no grooves are formed in the bottom portion of the bottom housing half 90B at locations between the outer side wall 91B-1 and the end walls 92B in the connector width direction X. In other words, in the range extending from the outer side wall 91B-1 to the end walls 92B, the bottom end face of the bottom housing half 90B has a flat surface. Therefore, since in the present embodiment the bottom housing half 90B has large solid sections formed in the direction of connection (vertical direction) Z at locations between the outer side wall 91B-1 and the end walls 92B, the strength of the outer side wall 91B-1 is not correspondingly decreased and flexural deformation in the wall thickness direction, i.e., in the direction of coupling Y, becomes less likely.

Although in the present embodiment no grooves at all are formed between the outer side wall 91B-1 and the end walls 92B, grooves of a certain depth or, more specifically, grooves that are smaller (shallower) than the engagement grooves 98A of the intermediate connecting units 10A in the direction of connection (vertical direction) Z may be formed as long as adequate strength for the outer side wall 91B-1 can be ensured. Since the outer side wall 91B-1 is located outwardly of the linking member 130 of the counterpart connector 3 in the direction of coupling Y and is not involved in engagement with the linking member 130, no problems whatsoever arise due to absence of engagement grooves in the outer side wall 91B-1.

The coupling members 100 are fabricated by punching from a sheet metal member while keeping the surface of said sheet metal member flat while partially bending it. As can be seen in FIG. 2, the coupling members 100 are formed as strip-shaped members extending longitudinally in the direction of coupling Y and transversely in the direction of connection Z, i.e., in the vertical direction. As can be seen in FIG. 2, along with extending in the direction of coupling Y across the array range of the connecting units 10A, 10B, the coupling members 100 also extend in the direction of connection Z over a range spanning both housing halves 80A, 90A and 80B, 90B and are accommodated within the coupling member accommodating portions 87A, 87B, 97A, 97B in each end wall 82A, 82B, 92A, 92B of the connecting units 10A, 10B. In this manner, the coupling members 100 derive excellent shielding effects as a result of being located within each coupling member accommodating portion 87A, 87B, 97A, 97B of the connecting units 10A, 10B. In addition, in the present embodiment, the coupling members 100 are made of plate-shaped members whose major faces are perpendicular to the connector width direction X, and since their dimensions in the connector width direction X are substantially equal to the through-thickness dimensions of the coupling members 100, the intermediate connector 1 does not increase in size in the connector width direction X.

As can be seen in FIG. 2, the coupling members 100 have claw-shaped top locking tabs 101 and bottom locking tabs 102 (referred to collectively as “locking tabs 101, 102” when there is no need to distinguish between the two) formed at locations corresponding to each connecting unit 10A, 10B in the direction of coupling Y. The locking tabs 101, 102 lock to lockable portions (not shown) in the respectively corresponding housing halves 80A, 90A, 80B, 90B in the direction of connection Z and in the direction of coupling Y. As described hereinafter, once the multiple connecting units 10 have been coupled using the coupling members 100, the locking tabs 101, 102 are bent with a jig and locked to the housing halves 80A, 90A, 80B, 90B.

The procedure of assembly of the intermediate connectors 1 will be described next. First, with the interior side faces of the two blades 20 held in a face-to-face relationship with one another (see FIGS. 6 (A) and 6 (B)), the bottom half of each blade 20 is accommodated in the bottom housing half 90A of the intermediate connecting units 10A and in the bottom housing half 90B of the end connecting units 10B from above. In addition, the bottom housing halves 90A, 90B accommodating the two blades 20 in this manner are arranged side-by-side in the direction of coupling Y. At such time, along with placing one bottom housing half 90B at each opposite end in the direction of coupling Y, multiple bottom housing halves 90A are arranged side-by-side between the bottom housing halves 90B at the opposite ends.

Next, the top housing halves 80A of the intermediate connecting units 10A and the top housing halves 80B of the end connecting units 10B are brought to the respectively corresponding blades 20 from above in an upside down orientation with respect to the bottom housing halves 90A, 90B, and the top half of each blade 20 is accommodated within the top housing halves 80B, 90B from below. Subsequently, once the blades 20 have been accommodated within the top housing halves 80A, 80B and bottom housing halves 90A, 90B, the coupling members 100 are inserted in the direction of coupling Y into slit-shaped spaces formed in a vertically communicable manner by the coupling member accommodating portions 87A, 87B of the top housing halves 80A, 80B in cooperation with the coupling member accommodating portions 97A, 97B of the bottom housing halves 90A, 90B. At such time, non-bent locking tabs 101, 102 of the coupling members 100 are positioned at locations corresponding to the slit-like spaces formed in a vertically communicable manner by the end grooves 89A, 89B of the top housing halves 80A, 80B in cooperation with the end grooves 99A, 99B of the bottom housing halves 90A, 90B (see FIG. 3 (A), FIG. 3 (B), FIGS. 4 (A) and 4 (B)).

Next, a jig (not shown) is passed from the outside in the connector width direction X into the above-mentioned spaces formed by the end grooves 89A, 89B, and the locking tabs 101, 102 of the coupling members 100 are formed by bending. As a result, the locking tabs 101, 102 are locked to the top housing halves 80A, 80B and bottom housing halves 90A, 90B, and the top housing halves 80A, 80B and bottom housing halves 90A, 90B are completely coupled in the direction of coupling Y and in the direction of connection Z, resulting in a single intermediate connector 1.

In order to efficiently and reliably assemble the intermediate connector 1 in the above-described procedure, first, the bottom housing halves 90A of the multiple intermediate connecting units 10A and the bottom housing halves 90B of the end connecting units 10B need to be secured in proper position. In the present embodiment, jig J is used to place the bottom housing halves 90A, 90B in the correct position and maintain their orientation. Jig J is partially illustrated in FIG. 7 (A), FIG. 7 (B), FIG. 8 (A), and FIG. 8 (B).

Figure 7B:
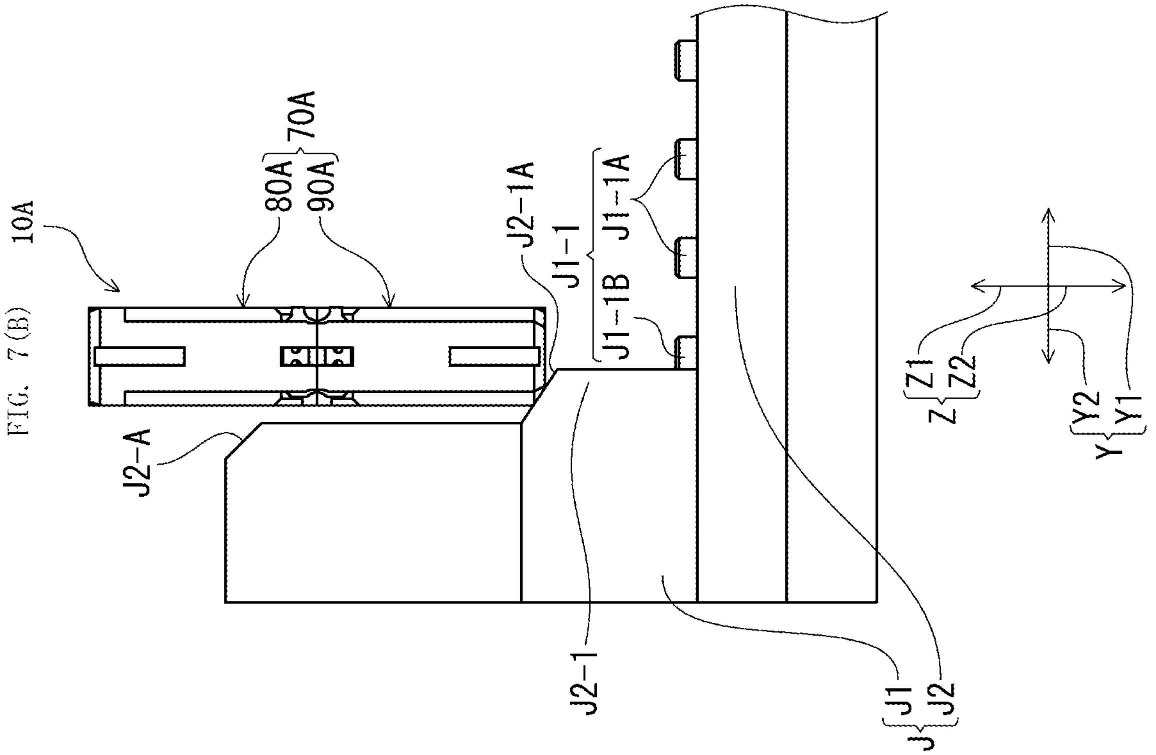
FIGS. 7 (A) and 7 (B) show a jig used to arrange the connecting units side-by-side, wherein FIG. 7 (A) illustrates a situation in which an end connecting unit has been placed in proper position, FIG. 7 (B) a situation in which an attempt has been made to mistakenly place an intermediate connecting unit in the position of an end connecting unit.
Figure 7A:
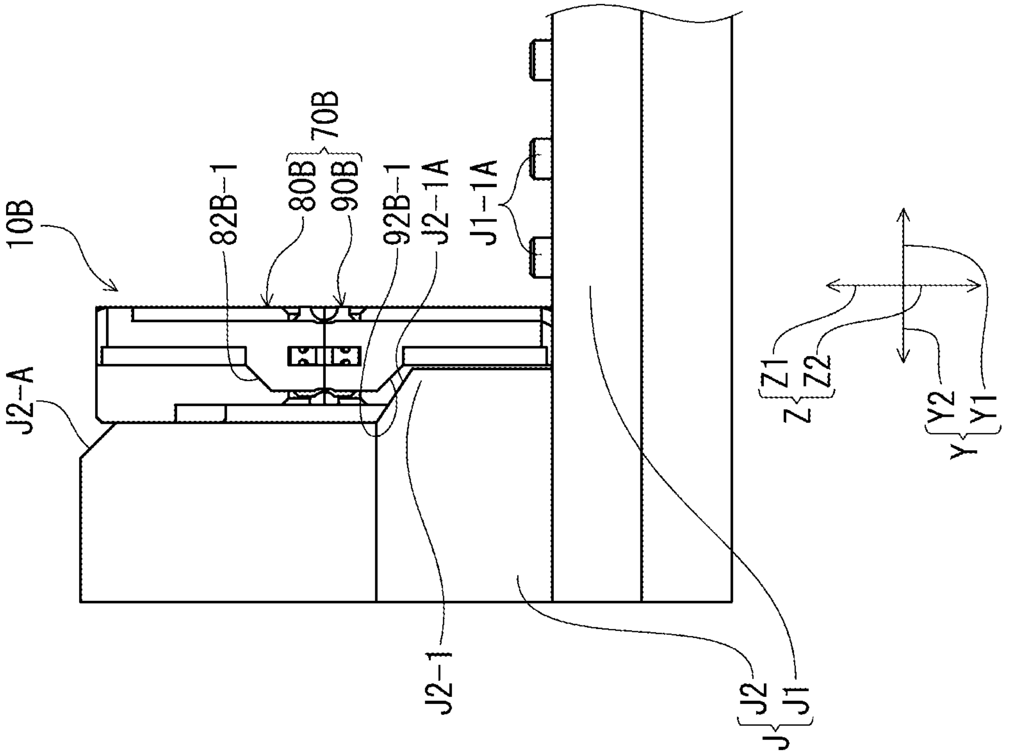
Figure 8A:
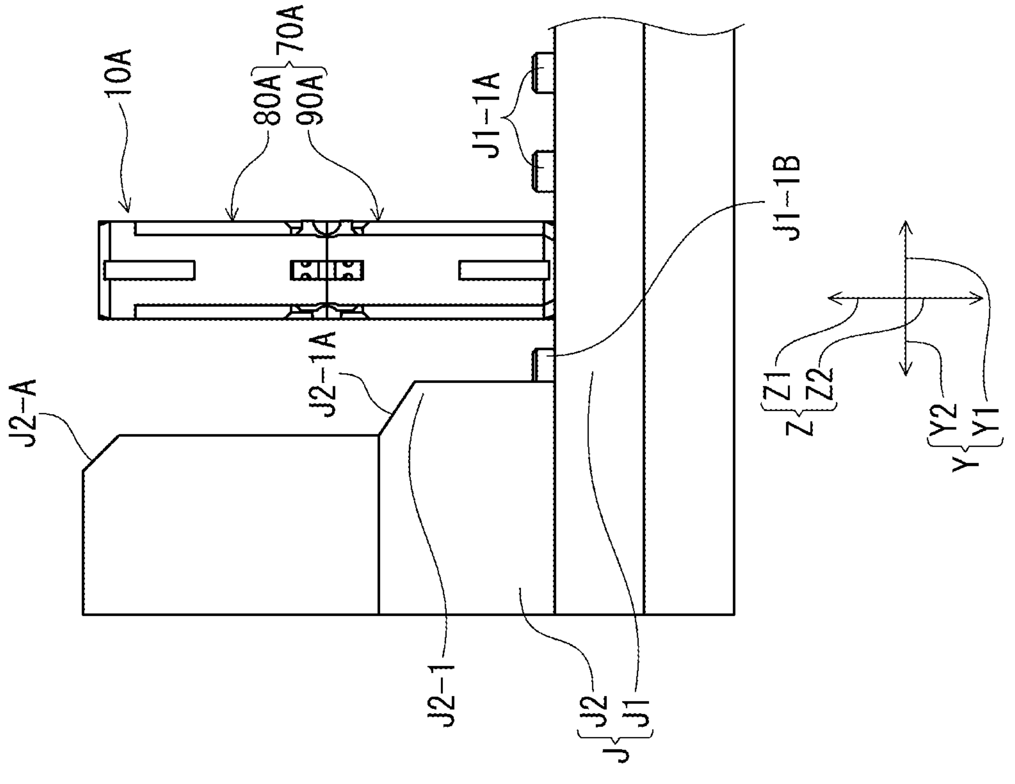
FIGS. 8 (A) and 8 (B) show a jig used to arrange the connecting units side-by-side, wherein FIG. 8 (A) illustrates a situation in which an intermediate connecting unit has been placed in proper position, and FIG. 8 (B) a situation in which an end connecting unit has been mistakenly placed in the position of an intermediate connecting unit.
Figure 8B:
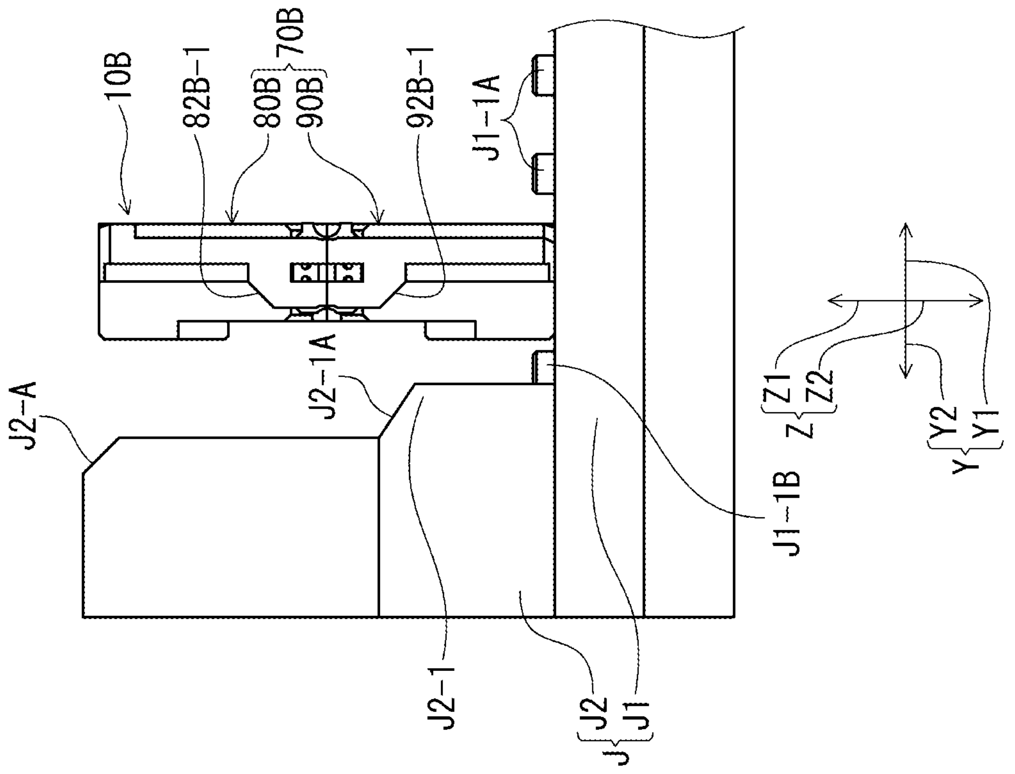

Although FIG. 7 (A), FIG. 7 (B), FIG. 8 (A), and FIG. 8 (B) illustrate states in which a single finished connecting unit 10A, 10B has been placed on jig J, or a state in which it is about to be placed on it, in actual practice, the units, one after another, are arranged side-by-side on jig J in a state wherein the bottom housing halves 90A, 90B accommodate the two blades 20 prior to completion of the connecting units 10A, 10B, in other words, in a state wherein the top housing halves 80A, 80B have not been attached.

When viewed in the connector width direction X, jig J has a U-shaped frame configuration that has a transverse portion J1 extending in the direction of coupling Y and vertical portions J2 rising upwardly along the Z1-axis at the opposite ends of the transverse portion J1. FIG. 7 (A), FIG. 7 (B), FIG. 8 (A), FIG. 8 (B) illustrate only the vertical portion J2 located on the Y2 side in the direction of coupling Y and the transverse portion J1 in its vicinity. Protrusions J1-1 used to determine the proper position of each bottom housing half 90A, 90B in the direction of coupling Y are provided on the transverse portion J1 at both ends in the connector width direction X so as to be arranged side-by-side at equal intervals in the direction of coupling Y. All the protrusions J1-1 are identically shaped and, as can be seen in FIG. 7 (B), include end protrusions J1-1B located at the ends in the direction of coupling Y and intermediate protrusions J1-1A located in between. The protrusions J1-1 are nested, from below, into spaces (not shown) formed proximate to the opposite ends of the bottom housing halves 90A, 90B in the connector width direction X and are capable of supporting the bottom housing halves 90A, 90B. The intermediate protrusions J1-1A support the bottom housing halves 90A of the intermediate connecting units 10A, and the end protrusions J1-1B support the bottom housing halves 90B of the end connecting units 10B.

Protrusions J2-1 are provided at the base of the vertical portions J2 at the opposite ends in the connector width direction X so as to be located in the corner portions formed by the vertical portions J2 and the transverse portion J1. These protrusions J2-1 protrude inwardly in the direction of coupling Y so as fit into the notched portions 92B-1 formed in the end walls 92 of the bottom housing halves 90B of the end connecting units 10B (see FIG. 7 (A)). In other words, due to the fact that the notched portions 92B-1 are formed in the bottom housing halves 90B of the end connecting units 10B in the present embodiment, when the bottom housing halves 90B are placed from above at the ends of the jig J, i.e., in proper positions, bottom housing halves 90B are placed without difficulty because the end walls 92B and the protrusions J2-1 do not collide and interfere with one another.

It should be noted that in the present embodiment tapered portions J2-A, J2-1A are formed respectively on the top internal side of the vertical portions J2 and on the top internal side of the protrusions J2-1 in the direction of coupling Y and when the bottom housing halves 90B are placed from above, they can be guided by the tapered portions J2-A, J2-1A.

On the other hand, the bottom housing halves 90A of the intermediate connecting units 10A differ from the bottom housing halves 90B of the end connecting units 10B in that they do not have notched portions in the end walls 92A (see FIG. 7 (B)). Therefore, if an attempt is made to place a bottom housing half 90A in an end position of the jig J by mistake, i.e., in a position where the bottom housing halves 90B of the end connecting units 10B should be placed, the bottom housing half 90A will collide and interfere with the protrusions J2-1 and it will be impossible to place it in such a position (see FIG. 7 (B)). Therefore, it will be immediately recognized that the bottom housing half 90A is about to be placed in a wrong position.

In addition, the notched portions 92B-1 are open only toward the outer side wall 91B-1 (Y2 side in FIG. 7 (A)) in the direction of coupling Y, and have an asymmetrical shape in the direction of coupling Y. Therefore, even in the case of a bottom housing half 90B of an end connecting unit 10B, when the orientation in the direction of coupling Y is incorrect, i.e., when the outer side wall 91B-1 is not in a face-to-face relationship with the vertical portion J2 and faces inward on the side opposite to the vertical portion J2 (Y1 side in FIG. 7 (A)), the bottom housing half 90B will collide and interfere with the protrusions J2-1 and it will be impossible to place the bottom housing half 90B in such a position. Therefore, it will be immediately recognized that the bottom housing half 90B is about to be placed in a wrong orientation.

Since in the present embodiment the intermediate protrusions J1-1A and the end protrusions J1-1B are of the same shape, the intermediate protrusions J1-1A can be fitted not only into the bottom housing halves 90A of the intermediate connecting units 10A, but also into the bottom housing halves 90B of the end connecting units 10B. However, as shown in FIG. 8 (B), if a bottom housing half 90B of an end connecting unit 10B is mistakenly placed in the position of an intermediate protrusion J1-1A, then as a result of the greater wall thickness of the outer side wall 91B of the bottom housing half 90B, the spacing between the bottom housing half 90B and the vertical portion J2 will become narrower, and it will be impossible to place another bottom housing half 90B of an end connecting unit 10B within this spacing, in other words, in the position of the end protrusion J1-1B. Therefore, should it be impossible to place another bottom housing half 90B on the end protrusion J1-1B, it can be recognized that a bottom housing half 90B of an end connecting unit 10B has been mistakenly placed in the position of the intermediate protrusion J1-1A adjacent to the end protrusion J1-1B.

In this manner, in the present embodiment, it can be quickly recognized that a bottom housing half 90A, 90B has been placed or about to be placed in a wrong position, which makes it possible to efficiently arrange bottom housing halves 90A, 90B side-by-side in proper positions.

Next, the top housing halves 80A, 80B are assembled to the bottom housing halves 90A, 90B supported by the jig J in accordance with the previously discussed procedure via the blades 20. Furthermore, as discussed before, upon insertion of the coupling members 100 in the direction of coupling Y into the slit-like spaces formed by the coupling member accommodating portions 87A, 87B of the top housing halves 80A, 80B in cooperation with the coupling member accommodating portions 97A, 97B of the bottom housing halves 90A, 90B, a single intermediate connector is obtained by bending the top locking tabs 101 and bottom locking tabs 102 of the coupling members 100. Then, jig J used for the bottom housing halves 90A, 90B is subsequently removed.

The configuration of the counterpart connectors 2, 3 will be described next. As can be seen in FIG. 1, in the present embodiment, the counterpart connectors 2, 3, whose number is equal to that of the connecting units 10 of the intermediate connector 1, are arranged side-by-side at equal intervals in the same direction as the direction of coupling Y of the connecting units 10, and all the counterpart connectors 2, 3 are linked by the hereinafter-described linking members 130. Since the counterpart connectors 2, 3 have exactly the same configuration, the discussion below will focus on the configuration of the counterpart connectors 3. The counterpart connectors 2 are assigned the same reference numerals as the counterpart connectors 3 and their description is omitted.

As can be seen in FIG. 1, the counterpart connectors 3 have a housing 110 made of electrically insulating material that extends longitudinally in the connector width direction X, an array of multiple terminals 120 (referred to as the "counterpart terminals 120" hereinbelow) retained in the connector width direction X by said housing 110, and counterpart grounding plates (not shown) retained in the housing 110.

As can be seen in FIG. 1, the housing 110, which extends longitudinally in the connector width direction X, is formed to have substantially the same dimensions as the intermediate connector 1 in the same direction. The housing 110 has multiple terminal accommodating portions 111 arranged at regular intervals in the connector width direction X on two wall surfaces (surfaces perpendicular to the direction of coupling Y) extending in the connector width direction X. The terminal accommodating portions 111, which have a groove-shaped configuration obtained by recessing the above-mentioned wall surfaces and extending in the direction of connection Z, i.e., in the vertical direction, are adapted to accommodate and retain the counterpart terminals 120.

The housing 110 has a counterpart grounding plate (not shown) made of sheet metal that is embedded and retained in place at an intermediate location in the direction of coupling Y, i.e., in the thickness direction. Said counterpart grounding plate, which has major faces perpendicular to the direction of coupling Y, extends across nearly the entire length of the counterpart connector 3 in the connector width direction X.

The counterpart terminals 120, which are made by punching from a sheet metal member in the through-thickness direction and have a generally strip-like configuration extending in the direction of connection Z, are press-fitted and retained in place in the terminal accommodating portions 111 of the housing 110 from below and are arranged side-by-side in the connector width direction X. The counterpart terminals 120 have contact portions on the upper end side for contacting the bottom contact portions 32A of the terminals 30 of the intermediate connector 1 as well as connecting portions on the lower end side for solder connections to corresponding circuits (not shown) on a circuit board. The connecting portions on the lower end side protrude from the bottom face of the housing 110, with FIG. 1 showing solder balls B attached to said connecting portions.

The linking members 130 have major faces that are perpendicular to the connector width direction X and extend across the entire array range of the counterpart connectors 3 in the direction of coupling Y of the counterpart connectors 3. In the present embodiment, the range in which the linking members 130 extend in the direction of coupling Y does not reach the position of the outer side walls 81B-1, 91B-1 of the end connecting units 10B located at the opposite ends of the intermediate connector 1. The linking members 130 are positioned such that their major faces are in a closely spaced face-to-face relationship with faces on both sides of the counterpart connector 3 in the connector width direction X (faces perpendicular to the connector width direction X) while the top edges of the linking members 130 are coupled to the grounding plate (not shown).

The operation of mating of the intermediate connector 1 and the counterpart connectors 2, 3 will be described next. First, multiple counterpart connectors 2, 3 are solder attached to respective different circuit boards (not shown). Next, the counterpart connectors 3 are disposed in an orientation (orientation illustrated in FIG. 1), in which the contact portions of the counterpart terminals 120 are positioned at the top and the intermediate connector is positioned above the counterpart connector 3 such that the lower receiving portions 12A, 12B of each connecting unit 10 of the intermediate connector 1 (see FIG. 6 (A) and FIG. 6 (B)) is aligned with the respectively corresponding counterpart connector 3.

Next, the intermediate connector 1 is lowered (see arrow in FIG. 1) along the Z2 axis and each connecting unit 10 is mated with the respectively corresponding counterpart connector 3 from above. When the mating of the intermediate connector 1 with the counterpart connector 3 is complete, the lower contact portions 32A of the terminals 30 provided on the blades 20 of the connecting units 10 are brought into contact under contact pressure and placed in electrical communication with the contact portions of the counterpart terminals 120 provided in the counterpart connectors 3.

Next, the counterpart connector 2, disposed in an orientation vertically inverted with respect to the counterpart connector 3 (the orientation illustrated in FIG. 1), is matingly connected to the intermediate connector 1 from above (see arrow in FIG. 1). The procedure for mating connecting the counterpart connector 2 is identical to the previously discussed procedure used for the counterpart connector 3.

Thus, as a result of matingly connecting the counterpart connector 2 and the counterpart connector 3 to the intermediate connector 1, the respectively corresponding counterpart connector 2 and counterpart connector 3 are electrically connected via the connecting units 10.

In the present embodiment, when the outer side wall 91B-1 and the inner side wall 91B-2 in the bottom housing halves 90B of the end connecting units 10B are pushed apart by the counterpart connector 3 and are subject to external forces directed away from each other in the direction of coupling Y in a state wherein the counterpart connector 3 has been mated with the intermediate connector 1 from below, the outer side walls 91B-1 of the end connecting units 10B are not in surface-to-surface contact with the side walls 91A of the adjacent intermediate connecting units 10A and are not supported in any way. On the other hand, in the present embodiment, no grooves are formed in the bottom portion of the bottom housing halves 90B at locations between the outer side wall 91B-1 and the end walls 92B in the connector width direction X, which is why the outer side walls 91B-1 themselves possess strength. In addition, the wall thickness of the outer side walls 91B-1 is partially greater than that of the inner side wall 91B-2, which provides a further strength enhancement. Therefore, the outer side walls 91B-1 are unlikely to undergo flexural deformation in their wall thickness direction (direction of coupling Y) and, as a result, are unlikely to be damaged.

The same things that are true for the previously described outer side walls 91B-1 of the bottom housing halves 90B apply to the outer side walls 81B-1 of the top housing halves 80B of the end connecting units 10B in a state wherein the counterpart connector 2 has been mated with the intermediate connector 1 from above, which adequately prevents flexural deformation, and therefore, damage to the outer side walls 81B-1.

DESCRIPTION OF THE REFERENCE NUMERALS

1 Electrical connector (intermediate connector)
2, 3 Counterpart connect bodies (counterpart connectors)
10 Connecting units
10A Intermediate connecting units
10B End connecting units
20 Blades
30 Terminals
70A, 70B Housings
81A, 91A; 81B, 91B Side walls
82A, 92A; 82B, 92B End walls
81B-1; 91B-1 Outer side walls
81B-2; 91B-2 Inner side walls
82B-1; 92B-1 Notched portions
85X1B, 85X2B; 95X1B, 95X2B Through-holes
86B-1, 96B-1 Through-holes
88A, 98A; 88B, 98B Engagement grooves

The invention claimed is:

1. An electrical connector comprising:

a plurality of connecting units coupled and formed as a result of retaining plate-shaped blades retaining an array of a plurality of terminals extending in a direction of connection with counterpart connect bodies in a housing in such a manner that a direction of coupling is the through-thickness direction of the blades, wherein the housing has a peripheral wall formed by two side walls facing each other in the through-thickness direction of the blades and two end walls located outside of the blade range in the plate width direction of the blades, that is, in the connector width direction; blade receiving portions used for blade insertion are formed in the peripheral wall;

the blades are inserted into and retained by the blade receiving portions of the housing;

the plurality of connecting units include end connecting units located at the opposite ends in the through-thickness direction of the blades and intermediate connecting units located between the end connecting units at the opposite ends;

engagement grooves that engage with a portion of the counterpart connect bodies are formed in the intermediate connecting units between the side walls and end walls of the housing so as to extend in the through-thickness direction of the blades and be open toward the counterpart connect bodies, and no grooves open toward the above-mentioned counterpart connect bodies to an extent equal to or greater than the depth of the engagement grooves of the above-mentioned intermediate connecting units are formed in the end connecting units between the end walls and at least the outer side walls located on the outside in the through-thickness direction of the blades.

2. The electrical connector according to claim 1, wherein at least the outer side walls of the end connecting units are thicker than the side walls of the intermediate connecting units.

3. The electrical connector according to claim 1, wherein the outer side walls in the end connecting units are thicker than the inner side walls located on the inside in the through-thickness direction of the blades and through-holes or recesses are formed on the side of the above-mentioned outer side walls in the above-mentioned direction of coupling.

4. The electrical connector according to claim 1, wherein the end connecting units have notched portions formed on the outer surface of the end walls, and the notched portions are open in said direction of connection and in the through-thickness direction of the blades at, at least, one end in the above-mentioned direction of connection.

* * * * *